United States Patent [19]

Misunas et al.

[11] 4,174,536
[45] Nov. 13, 1979

[54] DIGITAL COMMUNICATIONS CONTROLLER WITH FIRMWARE CONTROL

[75] Inventors: David P. Misunas, Brighton; Peter G. Jessel; Robert G. Jacobsen, both of Cambridge, all of Mass.

[73] Assignee: Massachusetts Institute of Technology, Cambridge, Mass.

[21] Appl. No.: 761,126

[22] Filed: Jan. 21, 1977

[51] Int. Cl.² .................... G06F 3/04; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,821,715 | 6/1974 | Hoff, Jr. et al. | 364/200 |
| 3,939,455 | 2/1976 | Toyosawa | 364/200 |
| 3,969,724 | 7/1976 | Anderson et al. | 364/200 |
| 3,979,730 | 9/1976 | Bennett et al. | 364/200 |
| 3,980,992 | 9/1976 | Levy et al. | 364/200 |
| 3,984,813 | 10/1976 | Chung | 364/200 |
| 4,020,472 | 4/1977 | Bennett et al. | 364/200 |
| 4,028,538 | 6/1977 | Olander, Jr. et al. | 364/900 |
| 4,079,452 | 3/1978 | Larson et al. | 364/200 |
| 4,095,265 | 6/1978 | Vrba | 364/200 |
| 4,097,924 | 6/1978 | Figini | 364/900 |

OTHER PUBLICATIONS

"Micro 800 Computer Reference Manual," Micro Systems Inc., 1969, pp. 1-44.
Tarui et al., "Twelve-Bit Microprocessor Nears Minicomputer's Performance Level" in *Electronics*, Mar. 21, 1974, pp. 111-116.
Reyling, Jr., "Considerations in Choosing a Microprogrammable Bit-Sliced Architecture" in *Computer*, Jul. 1974, pp. 26-28.

*Primary Examiner*—Melvin B. Chapnick
*Attorney, Agent, or Firm*—Arthur A. Smith, Jr.; Gerald Altman

[57] ABSTRACT

A microprocessor-based system serves as a message routing switch for communication between a number of different devices. Any device attached to the switch can communicate with any other attached device through a number of serial and parallel Input/Output ports. Communication between devices attached to the switch is in one of two formats. In a first method of communication, an attached device can be directly associated with another attached device in which case any communication from one is immediately transmitted to the other. In a second method of communication, an attached device communicates with the switch by means of fixed format packets, each of which contains a specification of its destination and error checking capabilities. This second method of communication permits examination of the validity of messages transmitted to or from the switch and enables message retransmission in the case of error.

34 Claims, 8 Drawing Figures

DIGITAL COMMUNICATIONS CONTROLLER WITH FIRMWARE CONTROL

The government has rights to this invention pursuant to contract number N-00014-75-C-0661, awarded by the Advanced Research Projects Agency of the Department of Defense and monitored by the Office of Naval Research.

BACKGROUND OF THE INVENTION

This invention relates generally to means for transfer of information between computer systems or between computer systems and other less sophisticated systems and devices.

The rapid proliferation of low cost computing systems, particularly microprocessor systems and peripherals, has given rise to a number of problems rarely, if ever, encountered before in the industry. One of the most significant of these problems involves the communication of information between these systems, between such systems and peripheral devices, and between such systems and larger, more sophisticated, computer systems.

Often, it is desirable for the software utilized by a microprocessor system to be produced upon a larger host computer and then transferred to the microprocessor for execution. The manner in which such a transfer is performed has involved the coupling of an Input-/Output (I/O) port of the larger computer system to such devices as a programmer for Read-Only Memories (ROM's) or some electronic circuitry to contain the program for operational access by the microprocessor.

Such methods involve the use of a number of I/O ports on the main computer, with the associated requirement for complex software support which permits a user on one I/O port to control the use of other I/O ports. Also, the number of available I/O ports is generally limited, and the requirement for additional ports to support development of several microcomputer systems is an expensive one. This requirement becomes even more expensive and unwieldy if the user is operating remotely over phone lines, due to the additional cost of using several lines and coupling to them.

Similarly, the communication of a small computer system with other small computer systems, or with shared or private peripheral devices has generally required the utilization of a number of I/O ports on the small system and the addition of significant hardware and software to provide the necessary interfaces and resolve conflicts at shared devices.

Various types of switching means to perform communication between large-scale systems have been developed. Such means generally embody either circuit-switching or packet-switching techniques. A circuit switching system such as ESS [1] is ideal for continuous communication, providing a direct connection between a number of systems. Such means is also exemplified by multiprocessor computer systems as IBM's ASP [2] which utilize peripheral processors for I/O communication. However, the use of such means provides little error checking capability and can lead to poor utilization in the case of short communications.

On the other hand, packet-switching means such as those utilized in large computer networks, of which the ARPA network [3, 4] is the most outstanding example, make efficient use of lines for short communication and provide error checking capabilities. In addition, a number of minicomputer systems have been developed specifically for this purpose [5, 6, 7]. Such means are inefficient in the case of long, direct communication, due to the overhead associated with each packet.

The various means of large-scale computer communication, of which the above two means represent two ends of a spectrum, have been to date costly to implement, due to the high relative cost of the control processor, prohibiting their use in such applications as those of microprocessor development systems.

1. "No. 1 Electronic Switching System," The Bell System Technical Journal, Vol. XLIII, No. 5, September 1964.

2. Rustin, R. (Ed.), Computer Networks Proceedings Courant Computer Science Symposium 3, December 1970, Prentice-Hall, Englewood Cliffs, NJ, 1970.

3. Heart, F., et al., "The Interface Message Processor for the ARPA Computer Network," AFIPS Conference Proceedings, Vol. 36, 1970.

4. Ornstein, S., et al., "The Terminal IMP for the ARPA Computer Network," AFIPS Conference Proceedings, Vol. 40, 1972.

5. Mann, W., et al., "A Network-Oriented Multiprocessor Front-End Handling Many Hosts and Hundreds of Terminals," AFIPS Conference Proceedings, 1976.

6. Brody, G., "Data Concentrators Using a Programmable Processor," Telecommunications, Vol. 5, No. 9, September 1971.

7. Spagnola, A., "Small Computers and Data Communications," Telecommunications, Vol. 5, No. 5, May 1971.

OBJECTIVE AND SUMMARY OF THE INVENTION

It is therefore an object of the invention of the present disclosure to simplify the process of computer communication.

It is a further object of the invention to provide an economical means for performing this function, one which will require only one connection from each computer or peripheral device to transfer information to a plurality of devices in a plurality of different disciplines.

It is a further object of this invention to provide a means for performing the objects described above with minimal software and hardware interface requirements for use of the invention.

In carrying out these and other objects of this invention, herein referred to as the "switch," there is a system comprising a microprocessor with a plurality of associated parallel and serial I/O ports. In the system of the described embodiment, one of the ports of the switch is connected to a host computer, one to a user terminal, and the remainder are available for bidirectional communication with other types of devices. The microprocessor has an associated control program which permits the transmission of information between a device attached to an I/O port of the switch and a device connected to any other I/O port of the switch.

Information transmitted to the switch is in one of two formats, corresponding to circuit-switching and packet-switching types of communication. In the first method of communication, circuit-switching communication, a port of the switch is associated with another port, and any message received at one port is immediately transmitted to the other. One example of this is communication between the terminal and the host or the terminal and a device attached to one of the other ports.

In the second method of communication, information transmitted to the switch is transferred in blocks, herein referred to as packets, each of the packets containing information specifying its destination port, and providing an error checking code. Before a packet is forwarded to the specified destination port, the error checking code is used to determine the validity of the packet contents ensuring correct transmission. In the case of incorrect transmission, retransmission is performed.

Generally, the illustrated embodiment features at least a microprocessor for operational control, at least a read-only memory for holding a representation of the operational instructions of the control program executed by the microprocessor, at least a random-access memory for holding a representation of the data utilized by the microprocessor in its execution of the control program, at least a serial interface for transmitting signals representing data in serial format from the microprocessor to an output port of the invention, at least a parallel interface for transmitting signals representing data in parallel format from the microprocessor to a further output port of the invention, control circuitry for managing the operation of the memories and the serial and parallel interfaces in accordance with the operation of the invention, and clock circuitry for synchronizing the operation of the microprocessor, the memory, and the interfaces. In a modification of the foregoing association of components, the parallel interface is eliminated in order to provide a machine of the same message transfer capability, but with a less sophisticated interface capability.

The invention accordingly comprises the system of the present disclosure, its components and their interrelationships, the scope of which will be indicated in the appended claims.

BRIEF DESCRIPTION OF THE DRAWINGS

For a fuller understanding of the nature and objects of the present invention, reference is to be made to the following description, which is to be taken in connection with the accompanying drawings, wherein.

DETAILED DESCRIPTION

Overview of the Preferred Embodiment

Figure 1:
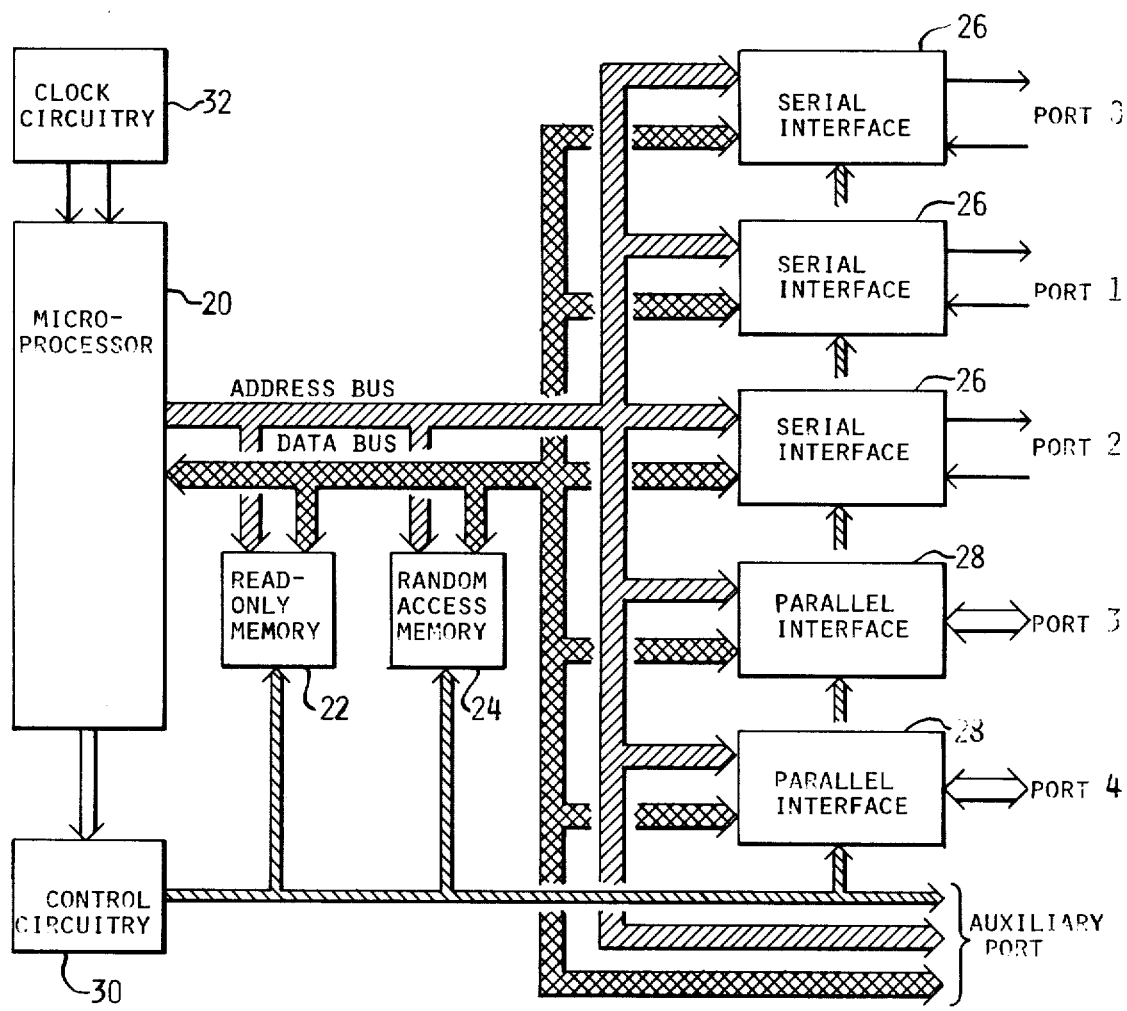
FIG. 1 is a general schematic of a system embodying the present disclosure.

Generally, the embodiment of FIG. 1 comprises a microprocessor 20 for operational control, one or more read-only memories 22 for holding a representation of the operational instructions of the control program executed by the microprocessor, one or more random-access memories 24 for holding a representation of the data utilized by the microprocessor in its operation, one or more serial interfaces 26 for transmitting signals representing data in serial format from the microprocessor to output ports of the invention, zero or more parallel interfaces 28 for transmitting signals representing data in parallel format from the microprocessor to output ports of the invention, control circuitry 30 for managing the operation of the memories 22 and 24 and the serial and parallel interfaces 26 and 28 in accordance with the operation of the invention, and clock circuitry 32 for synchronizing the operation of the microprocessor 20, the memories 22 and 24, and the serial and parallel interfaces 26 and 28.

In illustration of one embodiment of the invention, we describe below details of the components of the foregoing system following a discussion relating to characteristics of the invention.

The invention of the present disclosure provides a communication path between a host computer, a terminal, and a number of other devices. It does this in a manner which achieves the objects described above with the following characteristics:

1. The unit is invisible to the unsuspecting user and does not interfere with normal interaction between the terminal and the host computer.
2. The terminal can communicate directly with either the host computer (default connection) or one of the other ports of the switch.
3. Information can be easily transferred from one port of the switch to any other port of the switch.
4. Any type of device can communicate with the switch and hence with all other devices attached to it merely by following a prescribed communication protocol.

For the purpose of obtaining these goals, the communication discipline described in the following section is utilized.

Communication Protocol

There are two different communication protocols utilized by the switch for communication from device to device. A simple discipline is utilized for communication between the terminal and any of the other devices. In this discipline, there is no error checking, all information is transferred directly between the two associated devices.

The second communication protocol utilizes fixed format packets to transfer data blocks from device to device. Each packet contains a destination specification and error checking codes, providing a much more reliable means of communication than the first discipline. Each data block to be transferred is broken into packets which are transmitted in sequence, each packet containing up to 128 bytes of data. To illustrate the packet form of communication, a sample format for such a packet is presented below:

```
EOT
ENQ
packet type
destination port
packet length
packet length
   .
   .
   .
Packet content
```

-continued vertical parity (odd)
STX
ETX

Each of the above packets consists of a packet header (EOT, ENQ) followed by: a packet type identification field, a destination port specification, two copies of the packet length, and up to 128 8-bit bytes of data. Each packet is concluded with vertical parity (odd) and a trailer (STX, ETX).

Such a packet format allows error checking through the specification of the packet length and the inclusion of vertical parity in each packet. An acknowledge message of the following form is returned in response to any packet received by either the switch or a device to which it has sent a packet:

| EOT | or | EOT |
| ENQ | | ENQ |
| PACKET | | PACKET NOT CORRECT |
| CORRECT | | |

A return message is generated after checking the vertical parity and size of each packet, such a return message is always generated and indicates to the sending device that the packet was or was not correctly received.

If a packet was not correctly received, the receiving device ignores the complete packet transmission and the sending device retransmits the packet, using the same protocol.

If the packet was correctly received, upon receiving the "packet correct" message, the sending device either transmits the next packet in the data block or terminates the transmission sequence if the packet was the last packet of the data block.

The type identification field of a packet is used to designate that a packet is the only or final packet of a data block. The content of this field is ignored by the switch, however, it is utilized in the generation of the vertical parity.

This packet format is followed in most transmissions, with the explicit exception of those directed to or from the terminal. In the described embodiment, the terminal is considered a special case and any message received from it is immediately sent either to the host computer or to one of the other ports. The destination of such circuit-switched data is controlled by the user. Initially, the terminal is associated with the host computer system. However, by typing ⁻P⁻N <port number> CR (where — represents simultaneously depressing the control key while striking the following character, and CR represents a carriage return) the terminal is switched to the specified port and communicates directly with that port. Typing

⁻P⁻N CR reconnects the terminal with the host computer.

A message which is received by the switch from any port except the port to which the terminal is currently connected and which is not in the proper packet format is assumed to be directed to the terminal. If the terminal is currently connected to the port from which the message is received, the message is displayed immediately. Otherwise, the message is buffered until a carriage return is received, at which time the terminal will display the following:

**** message from port #n
<message> where n is the port number from which the messages were received. The buffering is provided to ensure that each complete line sent to the terminal is not fragmented when it is displayed. Without this provision, the characters of the line might be scattered among other output and never noticed.

Hardware Configuration

The overall structure of the switch is shown in FIG. 1. The unit is constructed of a Motorola M6800 microprocessor 20 with 1024 bytes of read-only memory (EAROM) 22, 1024 bytes of random-access memory (RAM) 24, and three serial 26 and two parallel 28 I/O ports. Two of the serial ports (port number 0 and port number 1) are connected to the terminal and the host computer, respectively. The third serial port is port number 2 and ports 3 and 4 are parallel output ports.

The user can couple additional parallel or serial ports to the switch through the auxiliary port. This port contains the data bus and the necessary address and control signals to accomplish the coupling of either a serial or parallel interface unit to it. Up to five devices, numbered 5 through 9, can be connected to this output. Each additional port can be either a serial or parallel unit; the switch is able to distinguish upon initialization whether an interface is connected to a port, and if so, which type.

Figure 2:
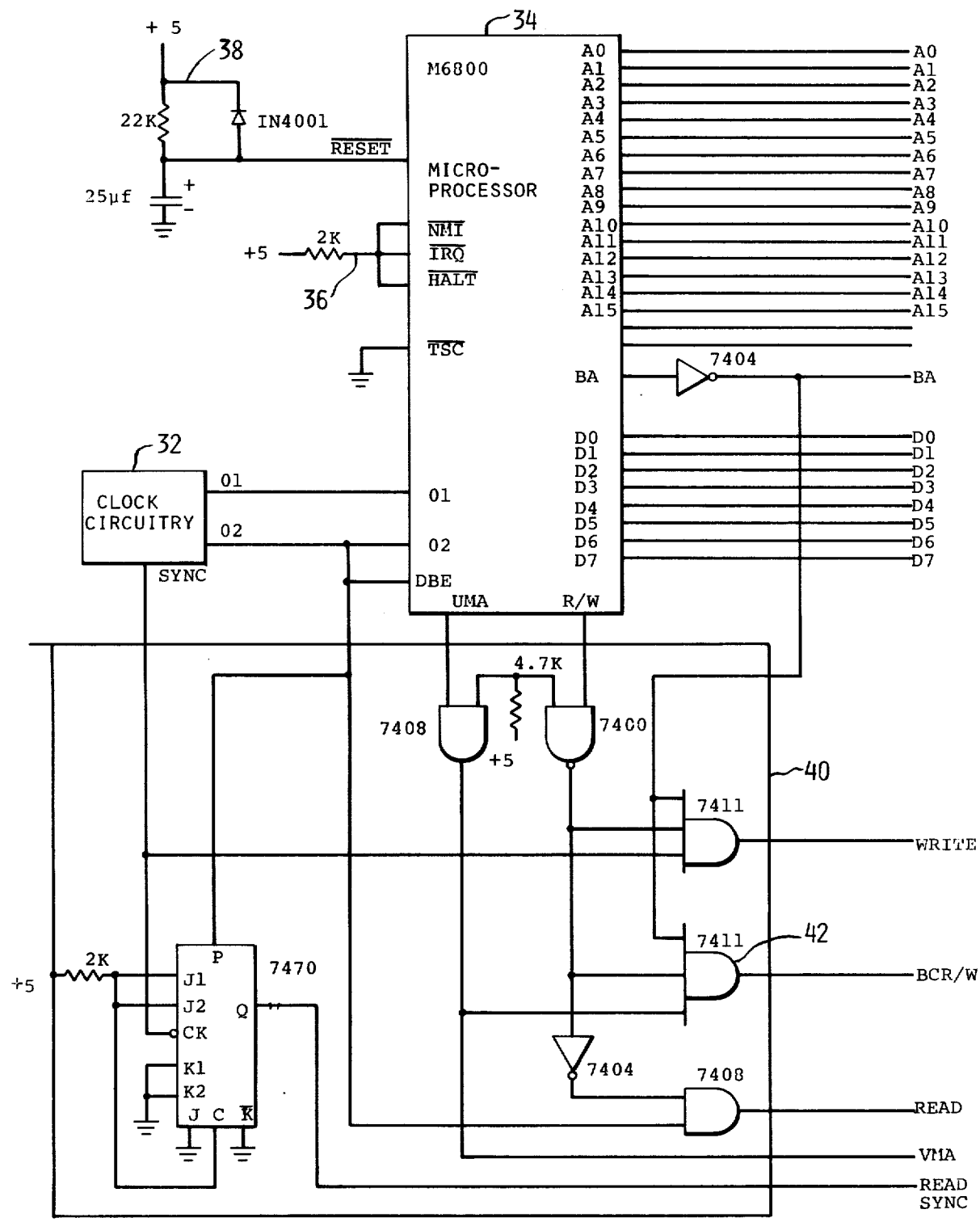
FIG. 2 is a general schematic of the microprocessor, clock, and control circuitry of the present invention.

The structure of the processor circuitry is shown in FIG. 2. The processor 34 is a Motorola M6800 microprocessor. The microprocessor is configured to operate without external intervention: The interrupt lines IRQ and NMI and the HALT line are held disabled at a logic high level by resistor 36. The RESET input of the microprocessor is connected to a RC combination 38 which causes the processor to reset and thereby initiate execution of the control program upon powering up of the unit.

The clock circuitry 32 generates the required two phase clock for operation of the microprocessor and an additional SYNC signal. The formats of these three signals are described later in conjunction with the operation of the control circuitry.

Figure 3:
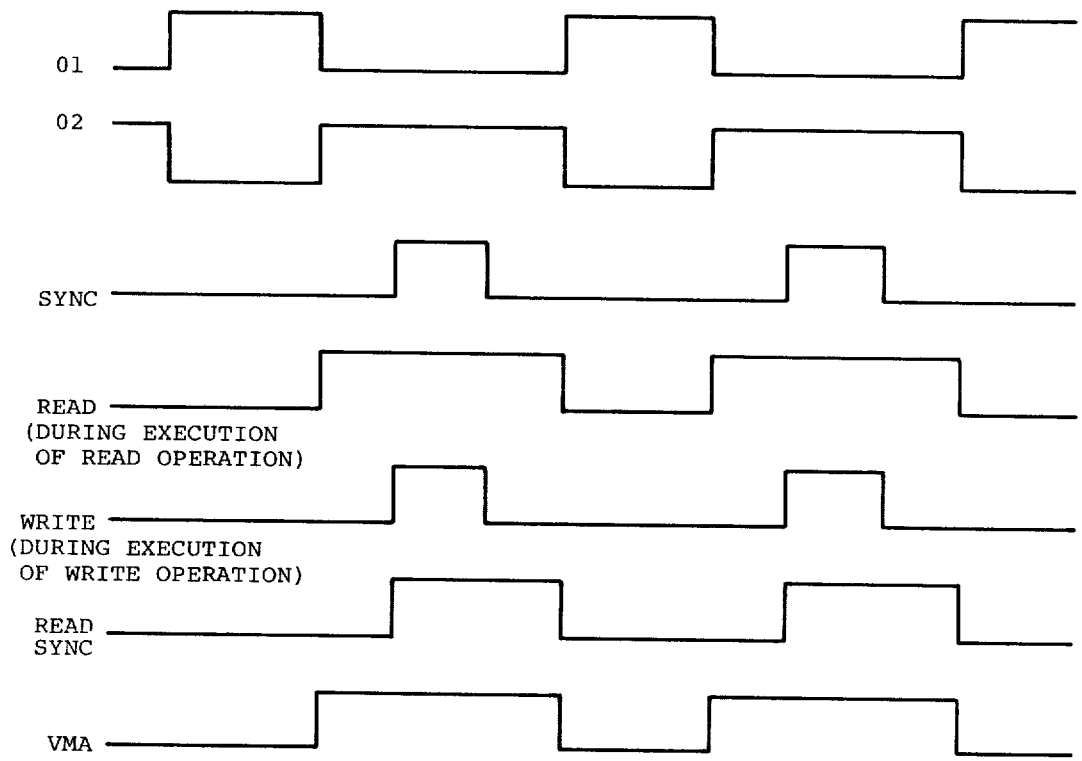
FIG. 3 is a schematic of the internal timing of operations within the system of FIG. 1.

The control logic 40 accepts the microprocessor Valid Memory Address (VMA) and Read/Write (R/W) output signals along with the timing signals from the clock circuitry to generate the control signals shown in FIG. 3. The VMA signal from the microprocessor is buffered and used to designate that there is a valid address on the address bus, in conjunction with the performance of a read or write operation by the microprocessor. A READ or WRITE signal is used to enable an external circuit either for reading from the circuit into the microprocessor or for writing from the microprocessor into the circuit. The R/W signal from the microprocessor is ANDed with SYNC, resulting in a WRITE signal which occurs during the middle of the second phase of the microprocessor clock, when the address and data are both present and stable on their respective buses. This prevents any race condition from arising in the execution of microprocessor write operations. The READ SYNC signal occurs during the last three-quarters of phase two of the microprocessor clock, and is used as an enable to the parallel and serial ports. This signal enables those ports only after the address, data, and read or write signals are stable.

Figure 4:
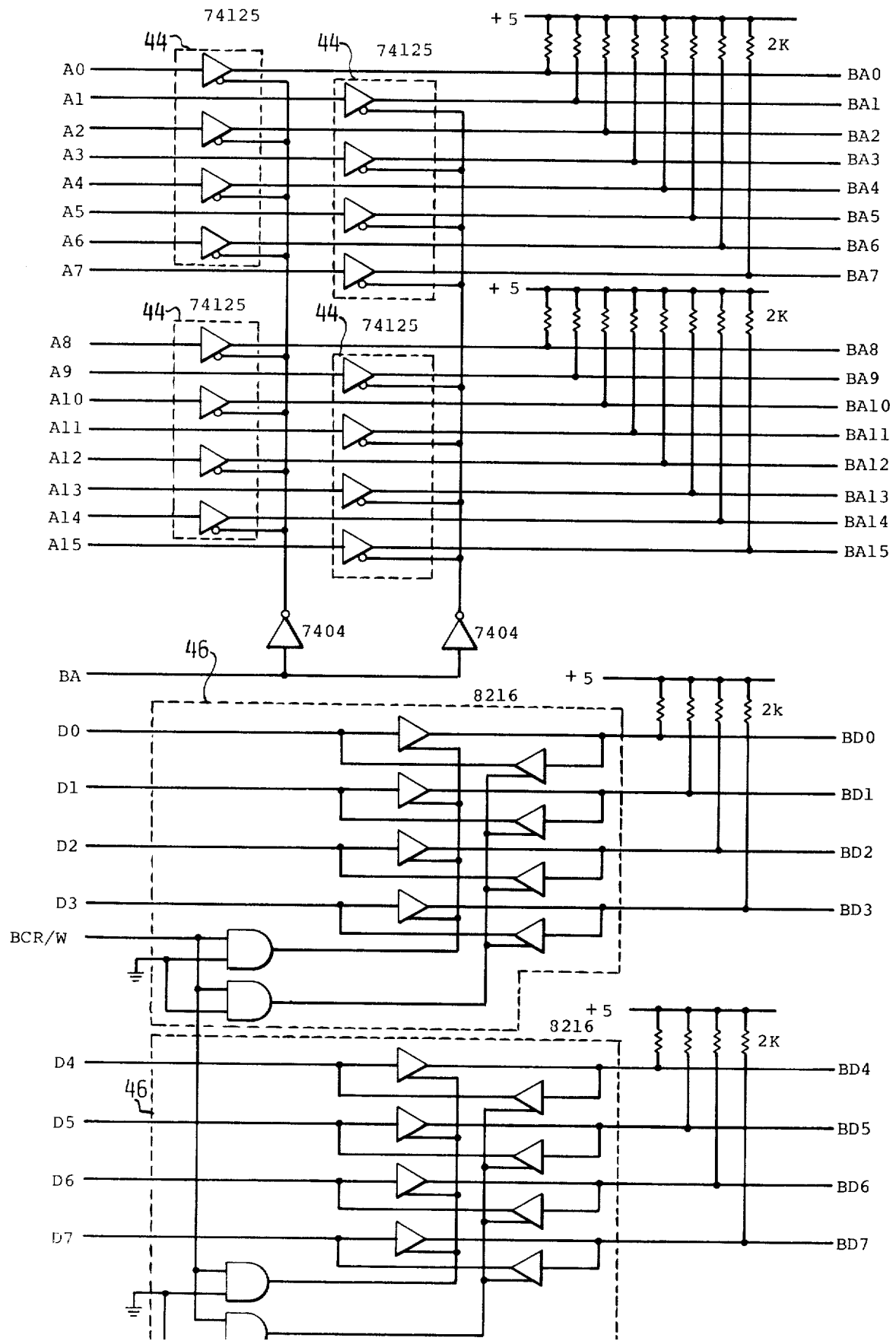
FIG. 4 is a general schematic of the bus buffer circuitry associated with the microprocessor of FIG. 2.

The bus buffer circuitry for both the data and address buses is shown in FIG. 4. The address bus drivers 44 and enabled by the microprocessor Bus Available (BA) signal. These drivers place the address associated with the execution by the microprocessor of a read or write operation upon the system address bus. The bidirectional bus drivers 46 perform a similar function, however, whether the drivers are writing from the microprocessor onto the system data bus or reading from the system data bus into the microprocessor is controlled by the Read/Write (R/W) signal generated at gate 42 of the control logic 40. Both the address and data buses are normally held at a logic high level by 2 K ohm pullup resistors.

Figure 5:
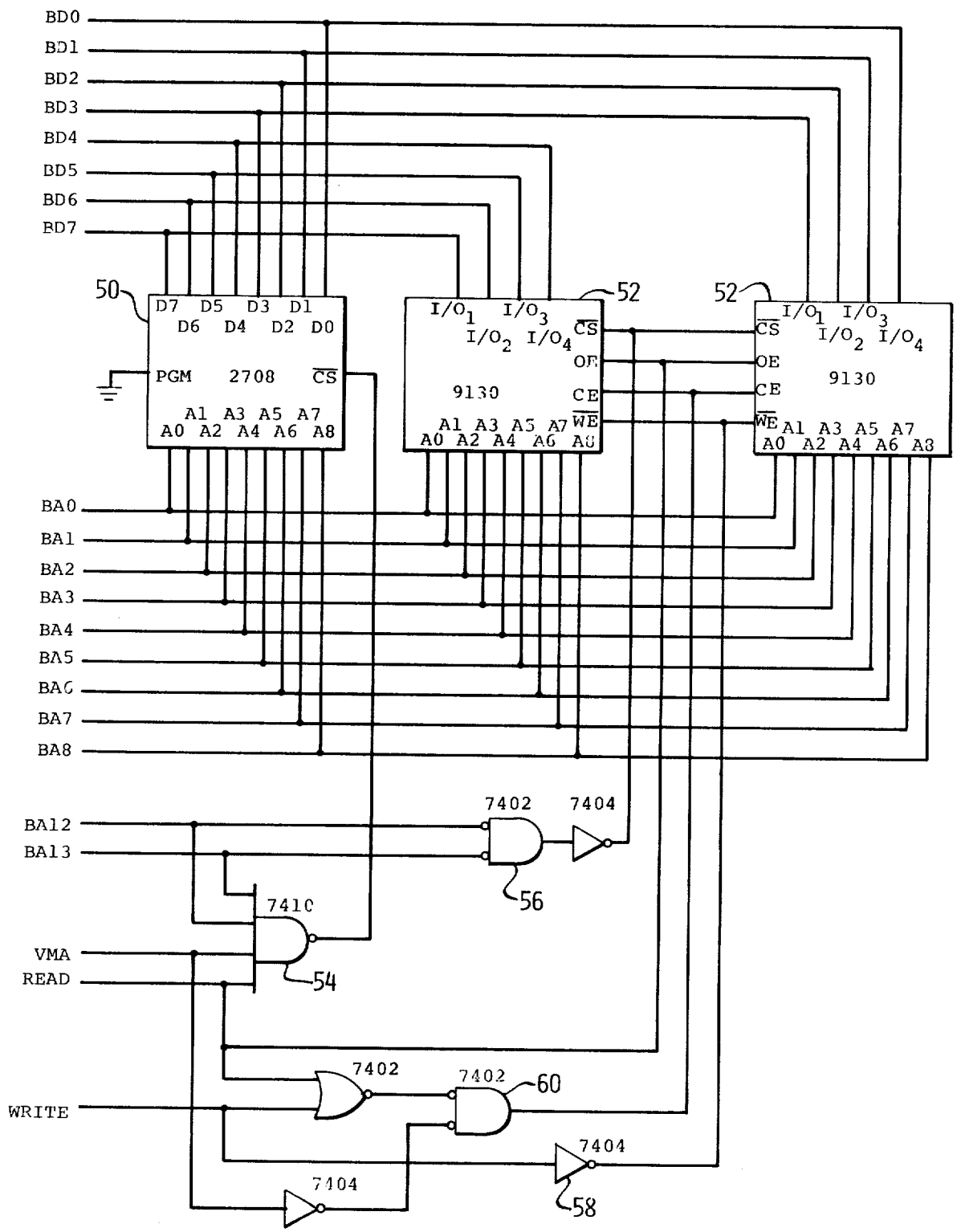
FIG. 5 is a general schematic of the memory circuitry of the present invention.

FIG. 5 contains a schematic for the memory circuitry of the system. The 2708 1024×8 bit EAROM 50 resides in the address space 3000-33ff hex and the two 9130 1024×4 static RAM chips 52 form a 1024×8 RAM residing in the address space 0000-03ff hex. The EAROM 50 is enabled only for reading by NAND gate 54 upon the presence of high logic levels on address bits A12 and A13 during the concurrent presence of Valid Memory Address (VMA) and READ signals. The RAM 52 is enabled by NOR gate 56 upon the presence of low logic levels on A12 and A13 in conjunction with a VMA signal. The R/W signal to the RAM 52 is provided by the inverted write signal at 58, whereas the output drivers of the RAM 52 are enabled only by a READ signal.

The signal [(R+W)(VMA)] provided at the output of 60 controls the Chip Enable (CE) of the RAM 52. Thus the RAM chips 52 are enabled only during valid read or write operations. However, for the RAM 52 to perform either a read or write operation, it must also be selected, as indicated by the presence of the Chip Select (CS) signal produced by NOR gate 56.

Figure 6:
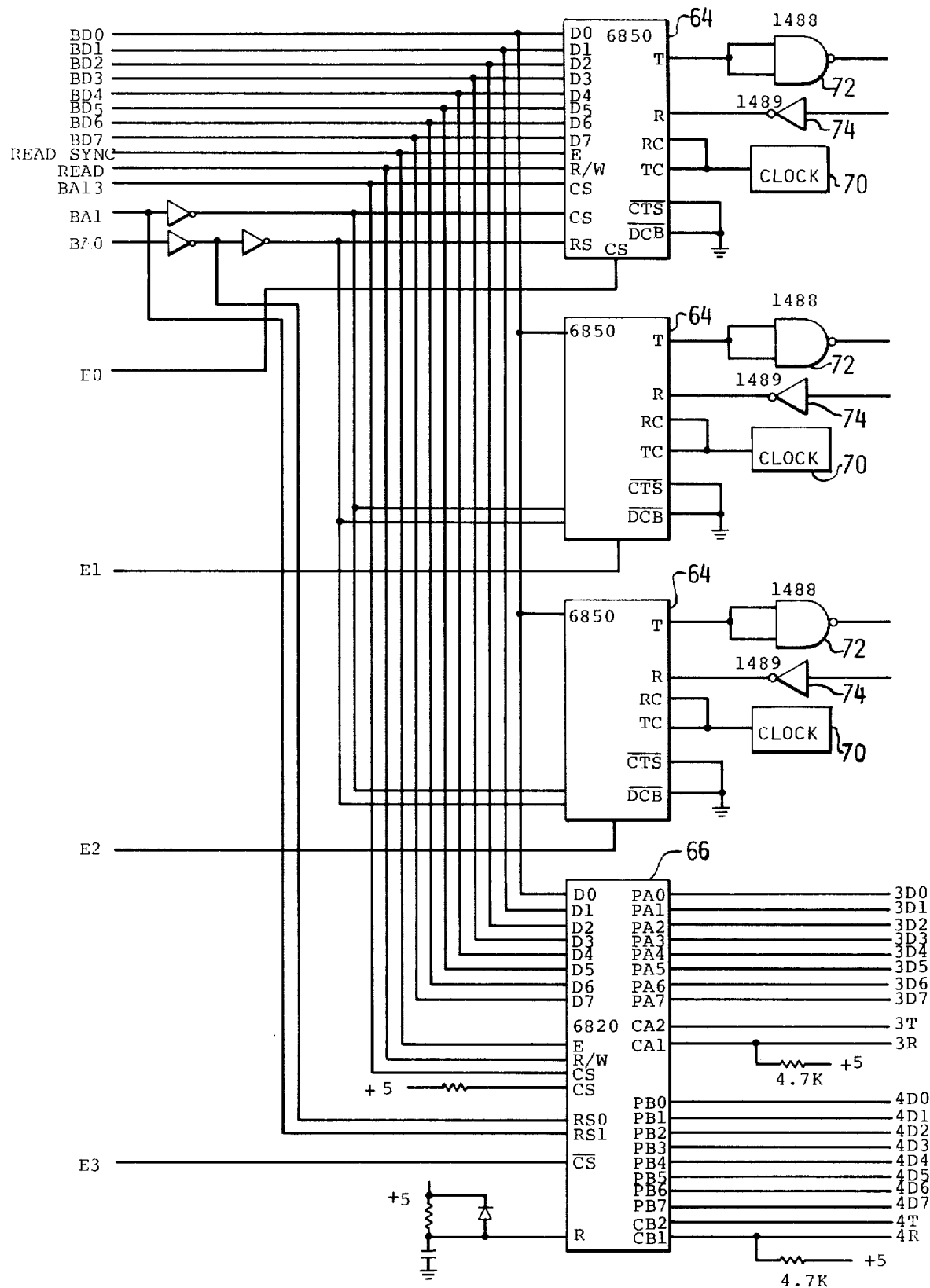
FIG. 6 is a general schematic of the I/O circuitry of the present invention.

The I/O circuitry is shown in FIG. 6. Each serial port is a separate M6850 Asynchronous Serial Interface Adaptor (ACIA) 64, a type of Universal Asynchronous Receiver-Transmitter (UART). The two parallel ports are formed of one M6820 Parallel Interface Adaptor (PIA) 66.

Each ACIA has an associated clock circuit 70 which determines the rate at which it will transmit and receive data. Serial communication is carried out at RS-232 12 volt levels through a 1488 72 and a 1489 74 EIA driver and receiver. Each ACIA contains an internal status register which is read by the microprocessor to determine whether the unit has received data or is free to transmit data. Also, an internal control register can be written into to set up formats for transmission and reception of data. Address bit A0 determines whether the microprocessor is reading from the status register or writing into the control register or is reading or writing data.

Similarly, the PIA 66 contains two internal status and control registers, one for each port of the PIA. Address bits A0 and A1 control the selection of these registers or the data register.

The I/O ports exist in the address space 2000-2024 hex. Each ACIA or PIA interface chip is allocated four addresses, selected by address bits A0 and A1, hence the interface chip itself is selected by address bits A2-A5.

All four addresses selected by address bits A0 and A1 are used by each PIA to designate the appropriate register, whereas each ACIA only uses the two lower addresses designated by bit A0 and is enabled only if A1=0. Each ACIA interface chip is one port, whereas a PIA interface chip consituates two ports.

Figure 7:
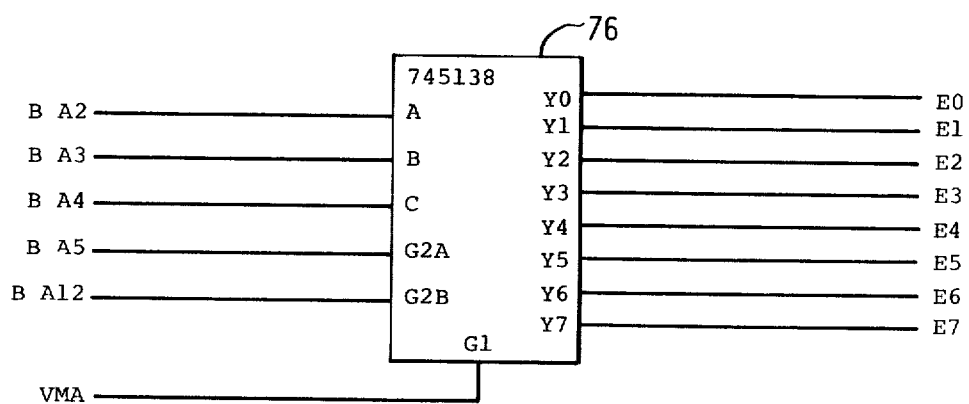
FIG. 7 is a general schematic of the port selection circuitry of the present invention.

The selection circuitry utilized to address a specific I/O interface chip is shown in FIG. 7. This circuit consists of a three-to-eight line decoder 76 to provide eight enable lines. The first four enable lines (E0-E3) are used to select ports 0 through 4 of the switch by enabling either one of the three ACIAs or the PIA.

To achieve the objectives of the present invention, the processor 20 could be a microprocessor with a word length of less than or equal to sixteen bits. The control program executed by the processor and contained in Read-Only Memory 22 could range in size from 256 words to 4096 words, determined by the microprocessor utilized and the characteristics of the system with which it is interacting. The Random-Access Memory 24 could range in size from 0 to 4096 words, determined by the buffering and control capabilities of the specific switch.

Parallel Communication Discipline

Since the data lines of a PIA are bidirectional, ports 3 and 4 must utilize the following asynchronous handshaking discipline to avoid the possibility of conflict; that is, to avoid the possibility of both the switch and the external device attempting to send simultaneously on the same wires. The communication discipline is implemented through use of the CA1, CA2, CB1, and CB2 status lines of the PIA's.

Each PIA is normally in read mode, hence, any message sent by the an external device is noticed and accepted upon arrival. If the external device wishes to send data, it signals this intent by placing a logic high level on the R or Cx1 wire, where x is either A or B, depending on the port to which the device is connected. After sending the R signal, the device waits 50 microseconds to ensure that the switch has noticed the request, after which the data is then placed upon the data wires. The switch, upon accepting the data, acknowledges this action by raising the T or Cx2 wire. The R signal and data are then removed by the external device, at which time the switch removes the T signal.

If the switch has data to send, it signals this fact by placing a logic high level on the T line (CA2, CB2) and then waits 50 microseconds to be sure that the attached device does not also with to send data. If at the end of the wait period, the associated device has not signalled by raising the R line (CA1, CB1) that is also wishes to send data, the output data is placed on the output wires of the PIA. A return signal from the external device on the R line then indicates an acknowledgement of the data. The receipt of this acknowledge signal causes the PIA to remove the data and its enable signal on the T line, after which the external device removes the acknowledge signal on the R line.

If a signal is received from the external device within the 50 microsecond wait period, that signal is accepted as a request to send to the switch, the signal on the T line is removed, and the data is accepted from the device in the manner described previously.

Control Algorithm

During operation of the switch, the microprocessor polls each port in sequence until it discovers a port with an input present. If the input message is not in the specified packet format, it is immediately sent to the correct destination and polling is resumed. However, if the discovered message is a portion of a packet transmission (indicated by a flag associated with the port and set upon discovery of a packet header), the message is placed in a buffer, and the microprocessor once again queries the other inputs.

For the user who wishes to execute his own software upon the microprocessor in the switch, a destination port specification of 0 in a packet received by the switch causes the associated data to be loaded into the RAM contained in the switch, starting at location 0, followed by a jump to location 0 upon completion of the transfer. The execution of a software interrupt (SWI) will cause a return from the program in RAM to the control program of the switch and will reset the switch, destroying the program which was being executed in the RAM.

Figure 8:
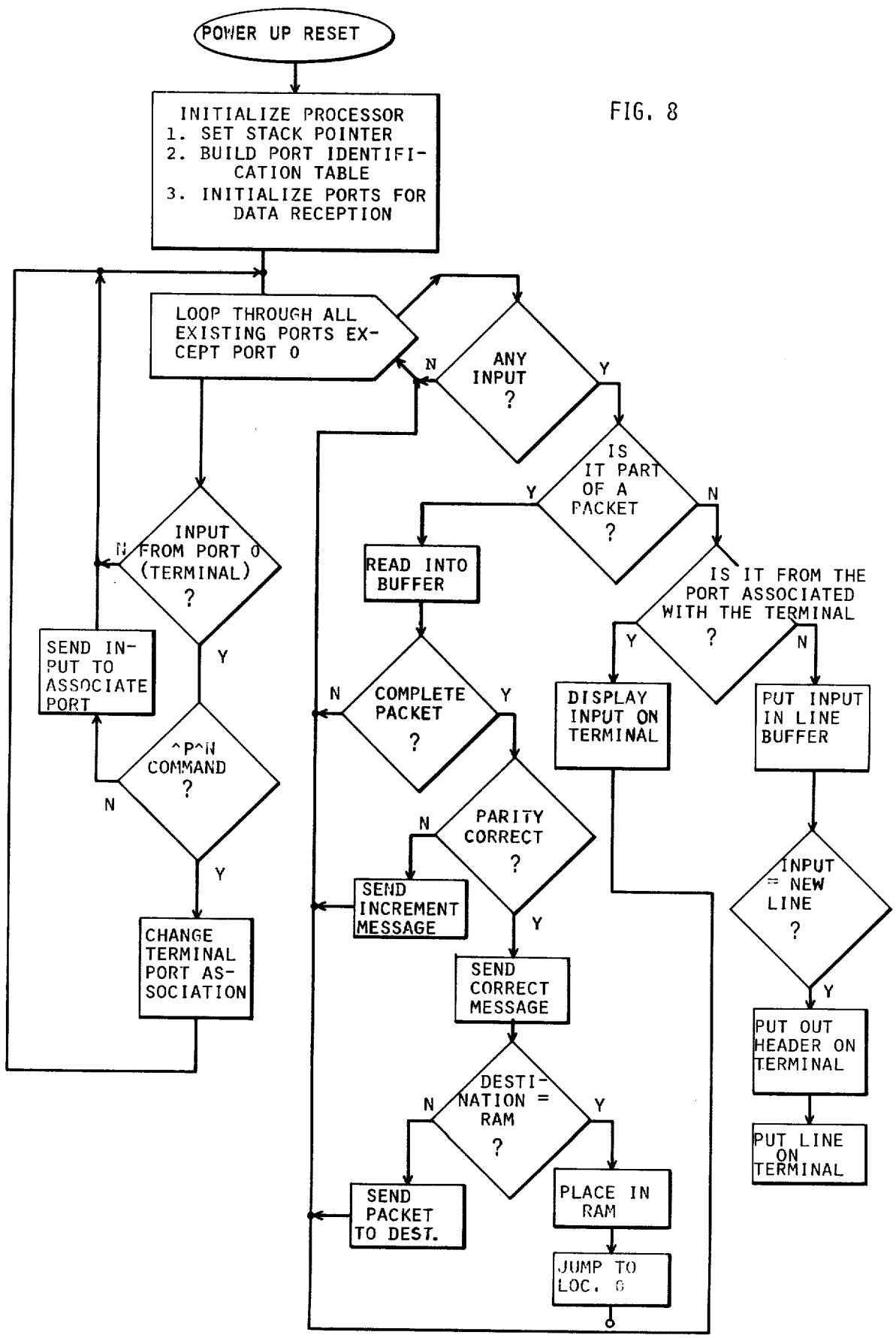
FIG. 8 is a general operational flow diagram of the control program contained in the memory of FIG. 5 and executed by the processor of FIG. 2 in accordance with the present invention.

FIG. 8 is a flow chart of the control program contained in the Read-Only Memory 50 and executed by the microprocessor 34.

Upon powering up of the processor or return to the control program through execution of a Software Interrupt (SWI) by a program residing in the RAM 52, the processor is initialized, and a table is set up in the RAM 52. The initialization routine sets the stack pointer to the top of RAM 52 for proper operation and clears the RAM 52 to prepare for message processing. The table set up in RAM 52 contains a designation of the type of each port (ACIA, PIA, or nonexistent) and a pointer to an input buffer for the port. The microprocessor determines whether a port is in use by execution of the following algorithm:

1. Read the lowest order address for the interface (CA1=CA0=0) to clear any startup transients.
2. Write a one into the control/status register designated by A1=0, A0=1.
3. Read from the same control/status register.
4. If the data read is all ones, there is no interface chip associated with that port address. If data bit D0=0 the interface is an ACIA. If bit D0=1 and the word is not all ones, the associated interface is a PIA.

Once the table has been initialized and the status of all interface ports has been determined, all detected parallel and serial interface chips are reset and initialized for data reception.

The main control algorithm consists of examining all input ports in sequence for data. If a message is present at a port, the processor determines if the message is part of a packet. If so, the message is placed in the buffer associated with that port. If the end of a packet is encountered, the parity is checked, and either an acknowledge is sent to the originator of the packet or a retransmission is requested, determined by the result of the parity check.

A correctly received packet is checked to see if it specifies port 0 as a destination. If so, it is loaded into the RAM 52 and execution is initiated at location 0. Otherwise, the packet is transmitted to the port specified in its destination port field. If the transmission is determined to be incorrect, the packet is ignored, and the microprocessor resumes polling.

If the message present at a port n is not part of a packet, the action taken is determined by whether the terminal is currently associated with that port or not. If so, the data received is immediately displayed upon the terminal. Otherwise, the data is buffered until a New-Line character is received, at which time the entire line is sent to the terminal with the header "**** message from port #n".

Once this control loop has been executed for all existing ports (with the exception of port 0), the microprocessor examines the terminal to see if it has sent any data. If not, the microprocessor returns to examine the status of the other ports once again. If a message is present from the terminal, the microprocessor determines whether the message is a switch command (−P−N). If so, the terminal is associated with the specified port. Otherwise, the message is sent to the port to which the terminal is currently attached.

Since certain changes may be made in the foregoing specification and the accompanying drawings without departing from the scope of the present invention, it is intended that all matter of the present disclosure be interpreted in an illustrative and not in a limiting sense.

What is claimed is:

1. A digital data processor comprising
   (a) processor means for operational control, said processor means consisting of computational means for performing arithmetic and logical operations on data items and communication means for transferring data items to and from said processor means;
   (b) serial interface means operatively connected to said processor means for receiving signals representing first data from said processor means over said communication means and, upon receipt of said signals representing said first data, transmitting signals representing said first data in serial format to a first peripheral device, and for receiving signals representing second data in serial format from a second peripheral device and, upon receipt of said signals representing said second data, transmitting signals representing said second data to said processor means over said communication means;
   (c) parallel interface means operatively connected to said processor means for receiving signals representing third data from said processor means over said communication means and, upon receipt of said signals representing said third data, transmitting signals representing said third data in parallel format to a third peripheral device, and for receiving signals representing fourth data in parallel format from a fourth peripheral device and, upon receipt of said signals representing said fourth data, transmitting signals representing said fourth data to said processor means over said communication means;
   (d) read-only memory means operatively connected to said processor means for holding an encoding of bits providing a precise specification of the operation of said processor means, causing said processor means to control the transmission of signals representing data received at one of said serial or parallel interface means to another of said serial or parallel interface means;
   (e) random-access memory means operatively connected to said processor means, providing temporary storage for use by said processor means and temporarily holding signals representing data received at one of said serial or parallel interface means, under control of said processor means while operating in the manner specified by said encoding of bits contained in said read-only memory means;
   (f) control means operatively connected between said processor means and said read-only memory means, said random-access memory means, said serial interface means, and said parallel interface means providing generation of control signals enabling communication over said communication means between said processor means and said read-only memory means, random-access memory means, serial interface means, and parallel interface means;

(g) clock means operatively connected to said processor means and said control means, said clock means providing means for synchronizing the operation of said processor means and said control means; and (h) said processor means operating in accordance with said encoding of bits contained in said read-only memory means to transfer from one of said serial or parallel interface means to another of said serial or parallel interface means both packets and single data items, wherein each of said packets contains a specification of the serial of parallel interface means to which it is to be transmitted and each of said single data items received at a serial or parallel interface means is transmitted to one or more serial or parallel interface means in accordance with a specification contained in said random-access memory means or in said read-only memory means.

2. The digital data processor of claim 1 wherein said processor means consists of a self-contained LSI processor.

3. The digital data processor of claim 2 wherein said self-contained LSI processor has a word length less than or equal to 16 bits.

4. The digital data processor of claim 1 wherein said read-only memory means consists of greater than or equal to 256 words and less than or equal to 4096 words of Read-Only Memory.

5. The digital data processor of claim 1 wherein said random-access memory means consists of less than or equal to 4096 words of Random-Access Memory.

6. The digital data processor of claim 1 wherein said serial interface means consists of at least one means for communication of signals representing data via a serial bit stream.

7. The digital data processor of claim 6 wherein each of said serial interface means comprises a device known as a Universal Asynchronous Receiver-Transmitter (UART).

8. The digital data processor of claim 1 wherein said parallel interface means consists of at least one means for communication of signals representing data transmitted in parallel format.

9. The digital data processor of claim 8 wherein each of said parallel interface means consists of a device known as a Parallel Interface Adapter (PIA).

10. The digital data processor of claim 1 wherein said control means consists of means for generating Read, Write, and synchronization signals for control of system operation.

11. The digital data processor of claim 1 wherein said clock means consists of means for generating clock signals necessary for operation of said processor means.

12. The digital data processor of claim 1 wherein said encoding of bits contained in said read-only memory means precisely specifies the operation of said processor means, causing said processor means to accept a plurality of signals representing a message from any of said serial or parallel interface means and transfer said signals representing said message to another of said serial or parallel interface means.

13. The digital data processor of claim 12 wherein said encoding of bits contained in said read-only memory means precisely specifies the operation of said processor means, causing said processor means to maintain a plurality of bits representing a table in said random-access memory means, said plurality of bits representing said table associating each of said serial or parallel interface means with a port of said digital data processor.

14. The digital data processor of claim 1 wherein said encoding of bits contained in said read-only memory means precisely specifies the operation of said processor means, causing said processor means to receive signals representing a plurality of messages simultaneously from said serial and parallel interface means and transfer said signals representing said messages to others of said serial and parallel interface means.

15. The digital data processor of claim 1 wherein said encoding of bits contained in said read-only memory means precisely specifies the operations of said processor means, causing said processing means to accept a plurality of signals representing a message from any of said serial or parallel interface means and to interpret said signals representing a message as consisting of signals representing either a single unit of data or a packet.

16. The digital data processor of claim 15 wherein said encoding of bits contained in said read-only memory means precisely specifies the operation of said processor means, causing said processor means to interpret signals representing a packet as consisting of signals representing a packet header, signals representing a plurality of data items, and signals representing a packet trailer.

17. The digital data processor of claim 16 wherein said encoding of bits contained in said read-only memory means precisely specifies the operation of said processor means, causing said processor means to interpret said signals representing said packet header as consisting of signals representing an identifier designating that said signals representing said message are part of a packet, signals representing a destination port specification, signals representing a type specification, and signals representing a length specification designating the number of messages comprising said packet.

18. The digital data processor of claim 17 wherein said encoding of bits contained in said read-only memory means precisely specifies the operation of said processor means, causing said processor means to interpret said signals representing said type specification as designating whether said packet is the last packet of a group of one or more packets or other than the last packet of a group of packets.

19. The digital data processor of claim 16 wherein said encoding of bits contained in said read-only memory means precisely specifies the operation of said processor means, causing said processor means to interpret said signals representing said packet trailer as consisting of signals representing an error checking specification and signals representing an end identifier specification.

20. The digital data processor of claim 19 wherein said encoding of bits contained in said read-only memory means precisely specifies the operation of said processor means, causing said processor means to interpret the signals representing said error checking specification as providing a specification which can be utilized for determining correct or incorrect transmission of said signals representing said packet.

21. The digital data processor of claim 20 wherein said encoding of bits contained in said read-only memory means precisely specifies the operation of said processor means, causing said processor means to interpret said signals representing said error checking specification as providing vertical parity for a plurality of the previous signals representing messages of said packet.

22. The digital data processor of claim 20 wherein said encoding of bits contained in said read-only memory means precisely specifies the operation of said processor means, causing said processor means to, upon determination of correct or incorrect transmission of said signals representing said packet, return signals to said parallel or serial interface means from which said signals representing said packet were received, the signals returned to said parallel or serial interface means from which said signals representing said packet were received representing a designation of whether said signals representing said packet were or were not correctly received.

23. The digital data processor of claim 20 wherein said encoding of bits contained in said read-only memory means precisely specifies the operation of said processor means, causing said processor means to ignore signals representing a packet which were incorrectly transmitted.

24. The digital data processor of claim 16 wherein said encoding of bits contained in said read-only memory means precisely specifies the operation of said processor means, causing said processor means to follow a packet transmission sequence which involves the transmission of signals representing the entire contents of a packet, then waiting for acknowledge signals, the acknowledge signals indicating correct or incorrect reception of said signals representing said transmitted packet and either terminating said packet transmission sequence or reinitiating said packet transmission sequence upon receipt of said acknowledge signals.

25. The digital data processor of claim 17 wherein said encoding of bits contained in said read-only memory means precisely specifies the operation of said processor means, causing said processor means to transmit signals representing a packet received at one of said parallel or serial interface means to another of said parallel or serial means designated by said signals representing said destination port specification for said signals representing said packet.

26. The digital data processor of claim 20 wherein said encoding of bits contained in said read-only memory means precisely specifies the operation of said processor means, causing said processor means to transmit signals representing said packet to said parallel or serial interface means designated by said signals representing said destination port specification only upon the detection of no transmission error in the received signals representing a packet.

27. The digital data processor of claim 15 wherein said encoding of bits contained in said read-only memory means precisely specifies the operation of said processor means, causing said processor means to transmit said signals representing said single unit of data immediately to one of said serial or parallel interface means.

28. The digital data processor of claim 27 wherein either said read-only memory means or said random-access memory means contains a plurality of bits representing a table which are interpreted by said processor means, as specified by said encoding of bits contained in said read-only memory means, to designate to which of said serial or parallel interface means said signals representing said single unit of data are to be transmitted.

29. The digital data processor of claim 28 wherein said bits representing said table consist of bits representing entries, each set of bits representing an entry designating a first group of one or more of said serial or parallel interface means which are to be considered connected to a second group of one or more of said parallel or serial interface means, where said bits representing said table are interpreted by said processor means, as specified by said encoding of bits contained in said read-only memory means, for the purpose of transmitting said signals representing said single unit of data received from one of said first group of interface means immediately to the members of said second group of interface means.

30. The digital data processor of claim 28 wherein said bits representing said table are contained in said random-access memory means and said encoding of bits contained in said read-only memory means precisely specifies the operation of said processor means, causing said processor means to alter the bits representing an entry in said bits representing said table under user control.

31. The digital data processor of claim 29 wherein one of said parallel or serial interface means is operatively connected to a terminal for the communication of data entered on said terminal to said processor means and the communication of data from said processor means to the display associated with said terminal.

32. The digital data processor of claim 31 wherein said encoding of bits contained in said read-only memory means precisely specifies the operation of said processor means, causing said processor means to send said signals representing said single unit of data received from said first group of interface means to the serial or parallel interface means operatively connected to said terminal if the serial or parallel interface means operatively connected to said terminal is currently associated in said bits representing said table with said first group of interface means, otherwise said signals representing said message are stored in said random-access memory means until a plurality of signals representing messages have been received, at which time, signals representing the messages are transmitted to said parallel or serial interface means operatively connected to said terminal.

33. The digital data processor of claim 16 wherein said encoding of bits contained in said read-only memory means precisely specifies the operation of said processor means, causing said processor means to interpret the signals representing said header of said packet as indicating that said packet is to be transmitted to said random-access memory means and executed by said processor means.

34. A digital data processor comprising
(a) processor means for operational control, said processor means consisting of computational means for performing arithmetic and logical operations on data items and communication means for transferring data items to and from said processor means;
(b) serial interface means operatively connected to said processor means for receiving signals representing first data from said processor means over said communication means and, upon receipt of said signals representing said first data, transmitting signals representing said first data in serial format to a first peripheral device, and for receiving signals representing second data in serial format from a second peripheral device and, upon receipt of said signals representing said second data, transmitting signals representing said second data to said processor means over said communication means;

(c) read-only memory means operatively connected to said processor means for holding an encoding of bits providing a precise specification of the operation of said processor means, causing said processor means to control the transmission of signals representing data received at one of said serial interface means to another of said serial interface means;

(d) random-access memory means operatively connected to said processor means, providing temporary storage for use by said processor means and temporarily holding signals representing data received at one of said serial interface means, under control of said processor means while operating in the manner specified by said encoding of bits contained in said read-only memory means;

(e) control means operatively connected between said processor means and said read-only memory means, said random-access memory means, and said serial interface means providing generation of control signals enabling communication over said communication means between said processor means and said read-only memory means, random-access memory means, and serial interface means;

(f) clock means operatively connected to said processor means and said control means, said clock means providing means for synchronizing the operation of said processor means and said control means; and (g) said processor means operating in accordance with said encoding of bits contained in said read-only memory means to transfer from one of said interface means to another of said interface means both packets and single data items, wherein each of said packets contains a specification of the interface means to which it is to be transmitted and each of said single data items received at an interface means is transmitted to one or more interface means in accordance with a specification contained in said random-access memory means or in said read-only memory means.

* * * * *